June 28, 1960 J. L. DUNN 2,943,299

ELECTRONIC PULSE DECODER

Filed Feb. 27, 1953

INVENTOR.
JENUS L. DUNN
BY Theodore C. Wood
AGENT
Wade Koontz
ATTORNEY 2,943,299

ELECTRONIC PULSE DECODER

Jenus L. Dunn, North Tonawanda, N.Y., assignor to the United States of America as represented by the Secretary of the Air Force Filed Feb. 27, 1953, Ser. No. 339,238

3 Claims. (Cl. 340—167)

This invention relates to an electronic pulse decoding circuit, and more particularly to a switching pulse producing circuit which will produce a switching pulse at one of its outputs provided that two pulses spaced in time by a predetermined amount has been received at its input and which will produce a different switching pulse at another of its outputs provided that three pulses spaced in time by a different predetermined amount has been received at its input.

In certain types of remote control systems, the control signals are transmitted over the same channel by using pulse discrimination. In order that maximum secrecy may be obtained in that type of control system one command function may be represented by two pulses spaced in time by a predetermined amount while another function is represented by three pulses, the second pulse being spaced in time from the first pulse by said predetermined time and the third pulse being spaced in time from the second pulse by a different predetermined amount of time. An example of a coding circuit for produicng that type of pulse discrimination is illustrated and described in copending application Serial No. 320,511, filed November 14, 1952, by John G. Leming, entitled "Electronic Pulse Coder." Although the switching pulse producing circuit of this invention is particularly well suited for use at the receiving end of such a type of control system, it is by no means limited to use in such a system, since it will also find use in other types of control systems, for example, in that type of system known as "pulse proportional system." In that last mentioned type system, the number of pulses determine the particular channel "to be opened" for additional incoming control information.

It is an object of this invention to provide a switching pulse producing circuit which will accurately distinguish between a two pulse input and a three pulse input in which the time spacing between the pulses of the three pulse input is different than the time spacing between the pulses of the two pulse input.

The above object, as well as other objects, features and advantages of this invention will be more readily understood in view of the following description when taken in conjunction with the attached drawing wherein.

Figure 1:
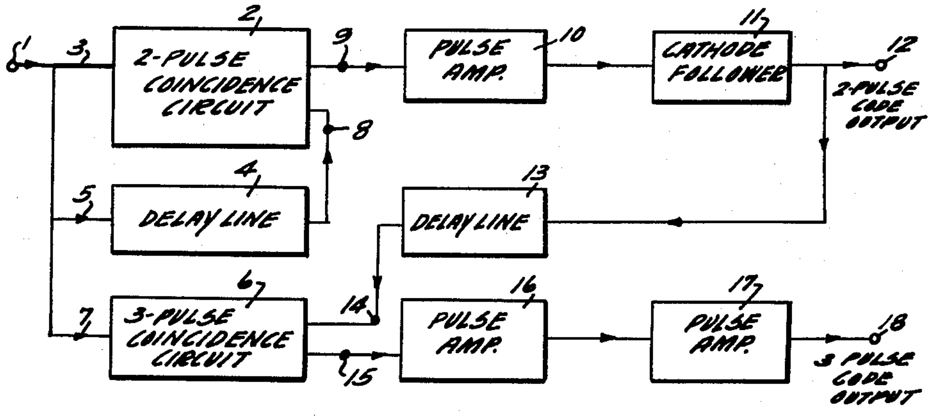
Fig. 1 is a block diagram of a switching pulse producing circuit constructed in accordance with the principles of this invention.

The input signals are applied to terminal 1 and are from there fed to the input of the two pulse coincident circuit 2 by way of conductor 3, the input pulses are also applied to the input of the delay line 4 by way of conductor 5, and those input pulses are also applied to the input of a three pulse coincident circuit 6 by way of conductor 7. Assuming that the signal applied to the input terminal 1 consists of two pulses spaced in time by an amount equal to the delay characteristic of delay line 4, the first pulse upon arriving at coincident circuit 2 will produce no output from that circuit, since there is no coincident pulse at terminal 8. The first pulse having been delayed by an amount, for example two microseconds, in the delay line 4, will arrive at terminal 8 coincident in time with the second pulse of the input signal and will therefore produce an output pulse at output terminal 9 of the coincident circuit 2 which may then be amplified by pulse amplifier 10 and subsequently applied to cathode follower 11 resulting in an output pulse at output terminal 12. The pulse from the cathode follower 11 is also applied to delay line 13 which delays the pulse by a predetermined amount of time which may be longer or shorter than the delay time of delay time 4, and is then applied to input terminal 14 of the three pulse coincident circuit 6. However, since the input signal consisted only of two pulses, no pulse will be applied to the three pulse coincident circuit 6 by conductor 7 and, therefore, no output pulse will appear at output terminal 15.

Assuming now that the input signal consisted of three pulses, the second pulse being spaced in time from the first pulse by one predetermined amount of time equal to the time delay characteristic of the delay line 4 and the third pulse being spaced in time from the second pulse by a second predetermined amount of time equal to the delay characteristic of delay line 13. As stated in the first assumed case, the second pulse of the three pulse signal will produce an output pulse at terminal 9 of coincident circuit 2 and that pulse having been amplified by amplifier 10 will be applied to the delay line 13 through the cathode follower 11 and will arrive at input terminal 14 of the third pulse coincident circuit 6 coincident in time with the third pulse of the input signal thus producing an output pulse at terminal 15 which may be amplified by suitable amplifiers 16 and 17 to produce an output pulse at output terminal 18.

Figure 2:
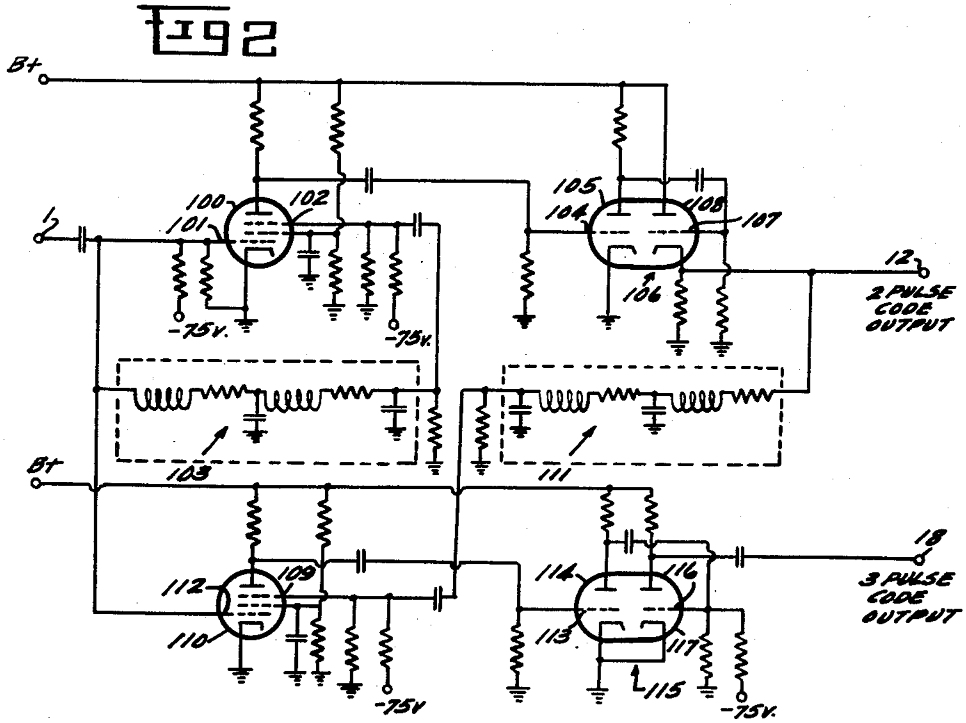
Fig. 2 is a schematic diagram in simplified form of the switching pulse producing circuit of Fig. 1.

The schematic diagram of the switching pulse producing circuit above described, is shown in Fig. 2. The circuit may consist of a first tube 100 having a first grid 101 and a second grid 102. The input pulses or signal applied to terminal 1 are fed directly or through a suitable coupling circuit to the grid 101 of tube 100 and those pulses are also fed to the grid 102 of tube 100 through the delay line 103. The tube 100 and its associated circuit form the coincidence circuit indicated in block form in Fig. 1 having the reference numeral 2. The associated circuits of tube 100 are such that anode-cathode current will not flow unless positive potentials are simultaneously applied to grids 101 and 102. The output pulse from the anode circuit of tube 100 is fed to the control grid 104 of section 105 of tube 106. Section 105 of tube 106 and its associated circuit form a conventional amplifier circuit and the output pulse from the anode circuit of section 105 is fed to the control grid 107 of section 108 of tube 106. Section 108 of tube 106 together with its associated circuit form a conventional cathode follower circuit and the output of that cathode follower circuit is connected to output terminal 12. The ouput from that cathode follower circuit is also applied to grid 109 of tube 110 through a delay line 111. The input signal pulses from terminal 1 are also applied to grid 112 of tube 110. Tube 110 together with its associated circuit form a coincidence circuit such as the third pulse coincidence circuit indicated in block form in Fig. 1 having reference numeral 6. The output pulse from the anode circuit of tube 110 is applied to control grid 113 of section 114 of tube 115. Section 114 of tube 115 together with its associated circuit form a conventional amplifier whose output is applied to control grid 116 of section 117 of tube 115. Section 117 of tube 115 together with its associated circuit form another conventional amplifier whose output is applied to output terminal 18.

From the above description it will be apparent that the delay line 103 is so constructed as to have a delay characteristic equal to the time spacing between the first and second pulse of the input signals and the delay line 111 is so constructed as to have a delay characteristic equal to the time spacing between the second and third pulse of the third pulse input signal. By the circuit above described the time spacing between pulses of the three pulse code signal input may be made different than the time spacing between the pulses of the two pulse code input signal and thereby it will be possible to use a more secret code.

Although in the above description particular coincidence circuits have been shown, and particular delay lines have been shown, it will be understood that those are merely examples of circuits which are suitable for the apparatus of this invention. But are in no way limiting to the invention, since many other circuits may be employed. Furthermore, it will be understood that the amplifiers and cathode follower described above are employed only when such circuits are required, and in certain apparatus constructed in accordance with the principles of this invention, such amplifiers and cathode follower may take other forms and in certain instances may not even be required.

What is claimed is:

1. An electronic pulse decoder comprising a first coincidence circuit having two input terminals and capable of producing an output pulse when pulses are simultaneously present at its two input terminals, means to apply signals to be decoded to one of said input terminals, a first time delay means to apply said signals to be decoded to the other of said input terminals after a first predetermined time delay, a second coincidence circuit having two input terminals and capable of producing an output pulse only when pulses are simultaneously present at its two input terminals, means to apply said signals to be decoded to one of said input terminals of said second coincidence circuit, a second time delay means to apply the output of said first coincidence circuit to the other of said input terminals of said second coincidence circuit after a second predetermined time delay, whereby when said signal to be decoded comprises two pulses spaced in time by said first predetermined time delay, an output pulse will be produced by said first coincidence circuit and when said signal to be decoded comprises three pulses having a time spacing from the first pulse to the second pulse equal to said first predetermined time delay and a time spacing from the second pulse to the third pulse equal to said second predetermined time delay, an output pulse will be produced by said second coincidence circuit.

2. An electronic pulse decoder comprising a first electron discharge device having at least an anode, a cathode, a first grid and a second grid, means for biasing said first electron discharge device to prevent anode-cathode current from flowing unless pulses are simultaneously present on said first grid and said second grid, means to apply signals to be decoded to said first grid, first time delay means to delay by a first predetermined amount of time said signals to be decoded and to apply said delayed signals to said second grid, a second electron discharge device having at least an anode, a cathode, a first grid and a second grid, means for biasing said second electron discharge device to prevent anode-cathode current from flowing unless pulses are simultaneously present on said first grid and said second grid, means to apply signals to be decoded to said first grid of said second electron discharge device, second time delay means to delay by a second predetermined amount of time output signals from said first electron discharge device and to apply said delayed output signals to said second grid of said second electron discharge device.

3. An electronic pulse decoder according to claim 2 wherein said first time delay means produces a time delay equal to the time spacing from the first pulse to the second pulse of said signal to be decoded and said second time delay means produces a time delay equal to the time spacing from the second pulse to the third pulse of said signal to be decoded whereby when said signal to be decoded comprises two pulses spaced in time equal to said first predetermined time, an output pulse will be produced by said first electron discharge device and when said signal to be decoded comprises three pulses, the first and second pulses being spaced in time equal to said first predetermined time and the second and third pulses being spaced in time equal to said second predetermined time, an output pulse will be produced by said second electron discharge device.

References Cited in the file of this patent

UNITED STATES PATENTS 2,403,561 Smith ------------------ July 9, 1946